United States Patent [19]

Giannuzzi

[11] 4,195,547
[45] Apr. 1, 1980

[54] ANCHOR BOLT ASSEMBLY

[76] Inventor: Louis N. Giannuzzi, 4 Shelter Dr., Cos Cob, Conn. 06807

[21] Appl. No.: 930,741

[22] Filed: Aug. 3, 1978

[51] Int. Cl.² ............................................. F16B 13/06
[52] U.S. Cl. ............................................. 85/74; 85/88
[58] Field of Search ................... 85/74, 75, 73, 76, 77, 85/78, 88, 87, 79, 67; 151/41.73

[56] References Cited

U.S. PATENT DOCUMENTS

| | | | |
|---|---|---|---|
| 674,715 | 5/1901 | Summerer | 85/75 |
| 1,035,277 | 8/1912 | Veres | 85/75 |
| 2,177,138 | 10/1939 | Hollander | 85/79 |
| 2,207,476 | 7/1940 | Bernstein | 85/83 X |
| 3,227,031 | 1/1966 | Williams | 85/67 |
| 3,272,952 | 9/1966 | McKeon | 85/83 X |
| 3,277,770 | 10/1966 | McCulloch | 85/79 |
| 3,443,474 | 5/1969 | Blakeley et al. | 85/74 X |
| 3,766,819 | 10/1973 | Giannuzzi | 85/88 X |
| 4,052,925 | 10/1977 | McCarthy | 85/88 X |

FOREIGN PATENT DOCUMENTS

| | | | |
|---|---|---|---|
| 2221267 | 1/1978 | Fed. Rep. of Germany | 85/73 |
| 137806 | 9/1920 | United Kingdom | 85/75 |
| 1453435 | 10/1976 | United Kingdom | 85/75 |

*Primary Examiner*—Ramon S. Britts
*Attorney, Agent, or Firm*—Michael Ebert

[57] ABSTRACT

A vibration-proof anchor bolt assembly which is insertable in a hole drilled in masonry for fastening a fixture to the surface thereof, the diameter of the hole being slightly larger than that of the bolt. The bolt is provided with an enlarged head that lies against the fixture and is engageable by a torque tool, the threaded rear section of the bolt being of reduced diameter. The upper portion of the rear section is encircled by an expansible shell which when expanded is forced against the wall of the hole to anchor the bolt therein. Received on the lower portion of the rear section is a wedge nut having an upper conical zone and a lower ring zone whose normal diameter is larger than that of the hole, slots being cut into said ring zone to define spring fingers. These fingers are inwardly flexed by the wall on the hole when the assembly is inserted therein, thereby compressing the ring and constricting the internally-threaded bore thereof. When the bolt assembly is fully inserted in the hole and the bolt head is turned by the tool, the wedge nut, whose rotation is arrested by the compressed ring, is axially advanced toward the shell, the conical zone of the nut entering the space between the shell and the rear section and acting progressively to expand the shell against the wall of the hole until a point is reached where the threaded end of the rear section enters the constricted bore of the compressed ring. The resultant advance of the wedge nut wedges the threaded portion of the bolt between the compressed spring fingers, forcing these fingers outwardly against the hole of the wall, to create pressure between the mating threads which prevents loosening of the bolt under vibratory conditions.

16 Claims, 23 Drawing Figures

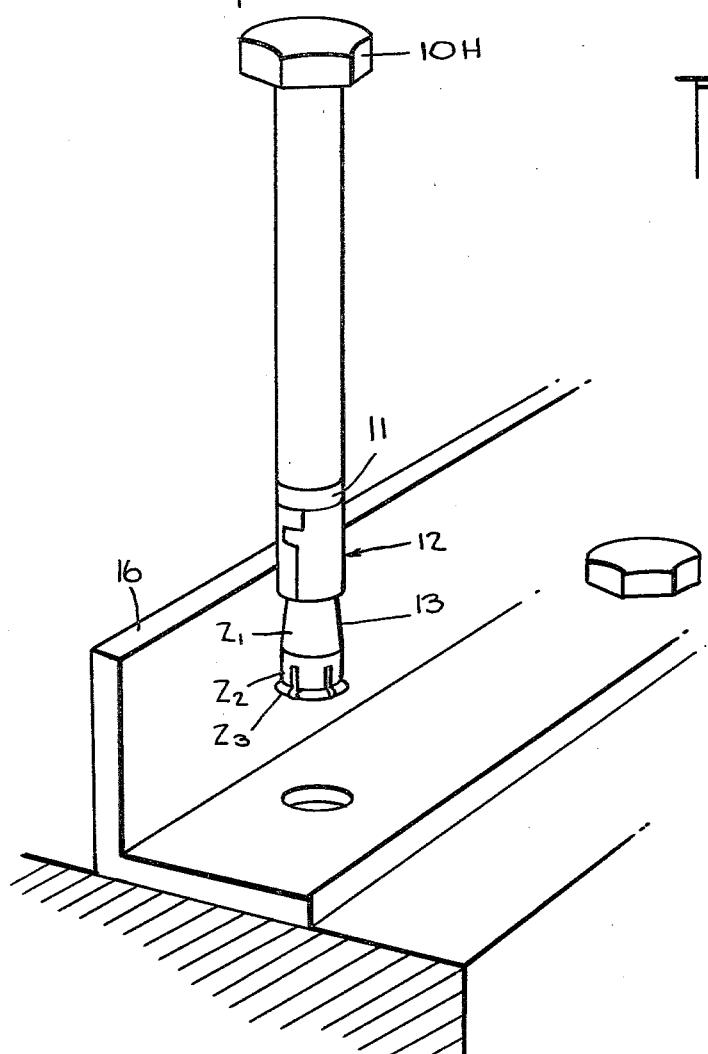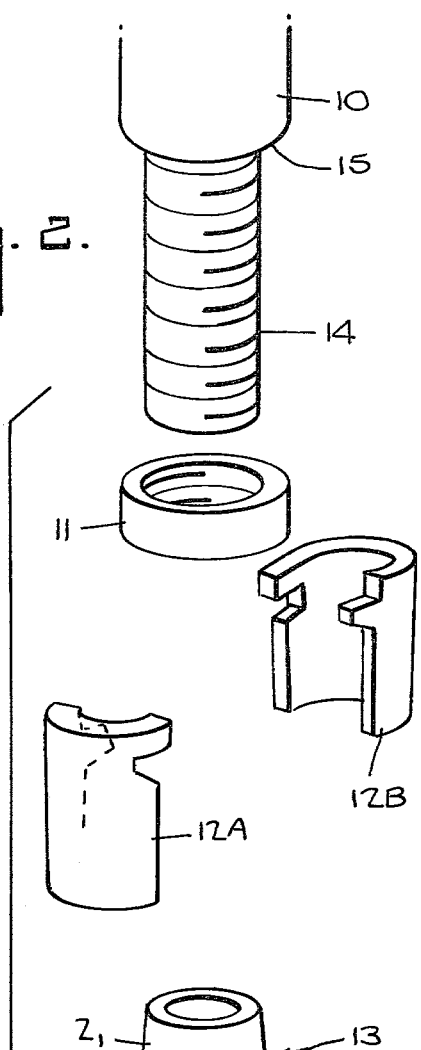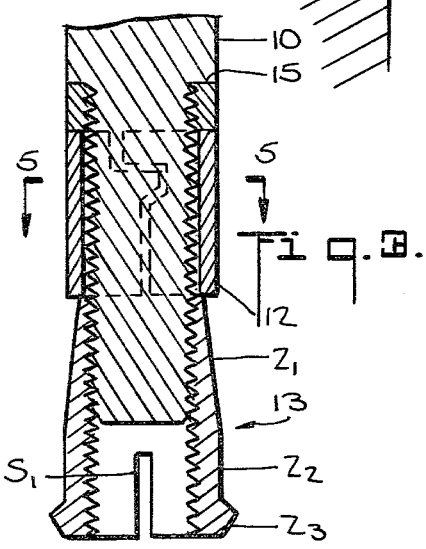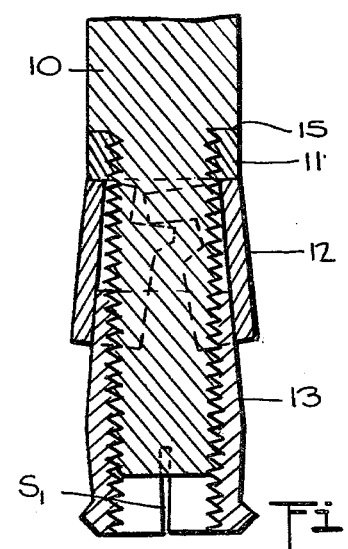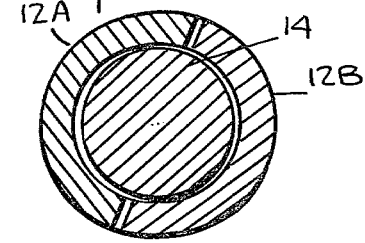

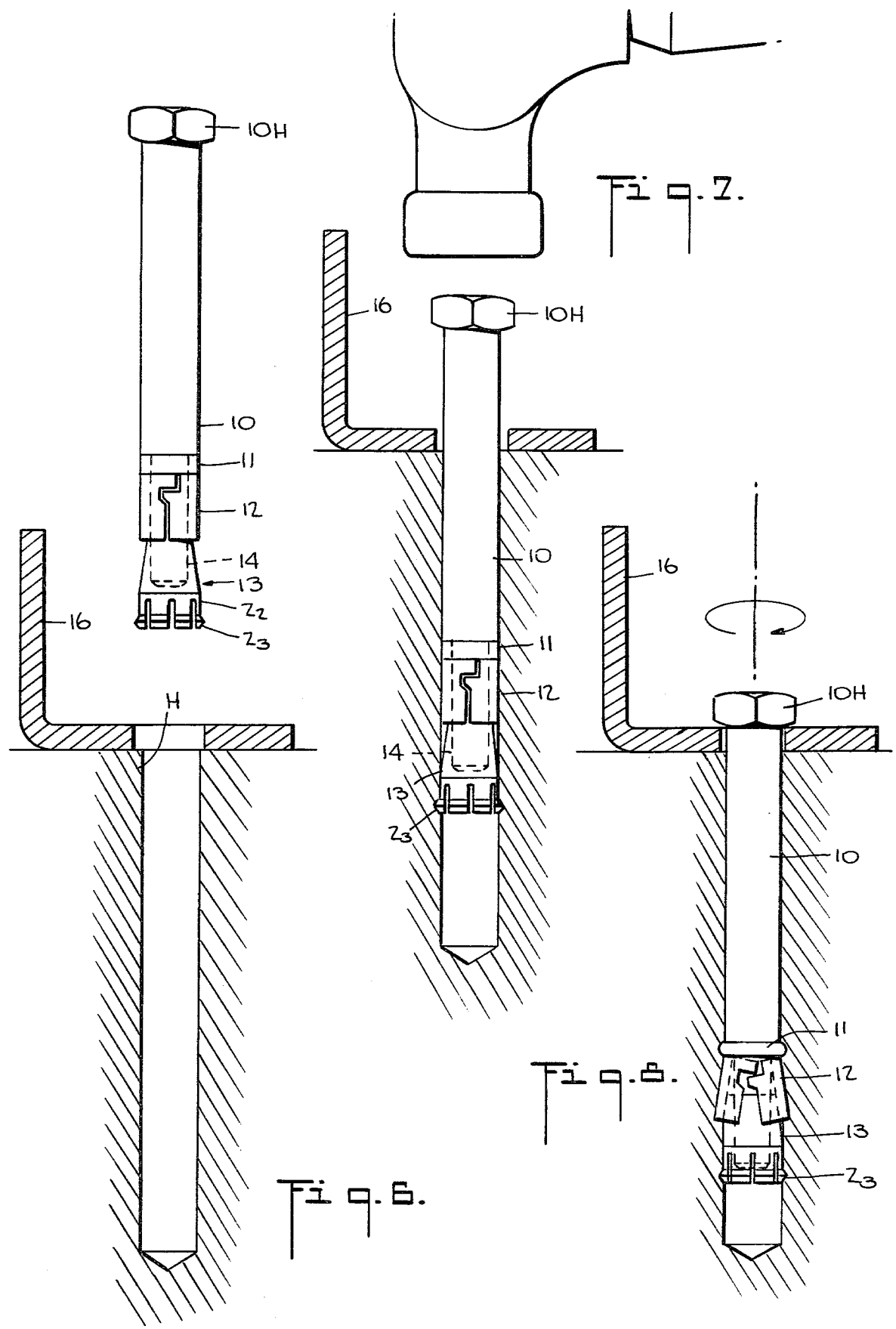

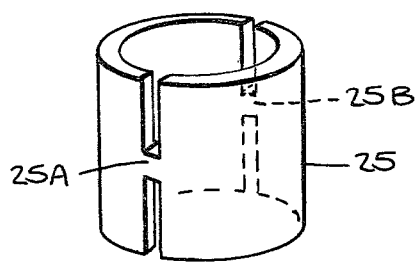
Fig. 17.
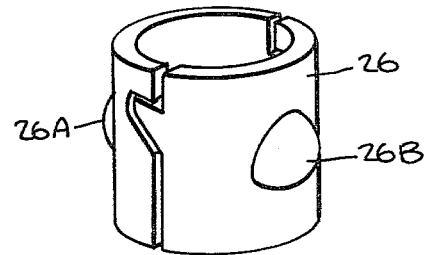
Fig. 18.
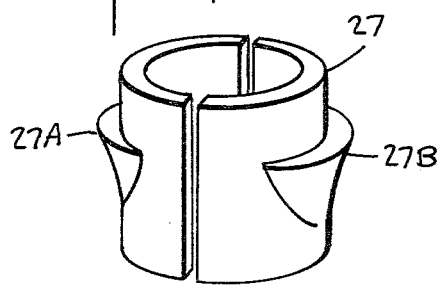
Fig. 19.
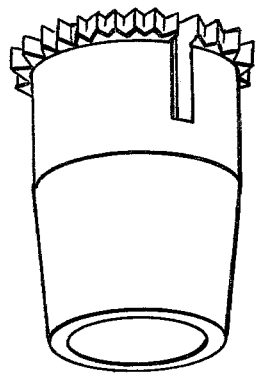
Fig. 23.
Fig. 20.
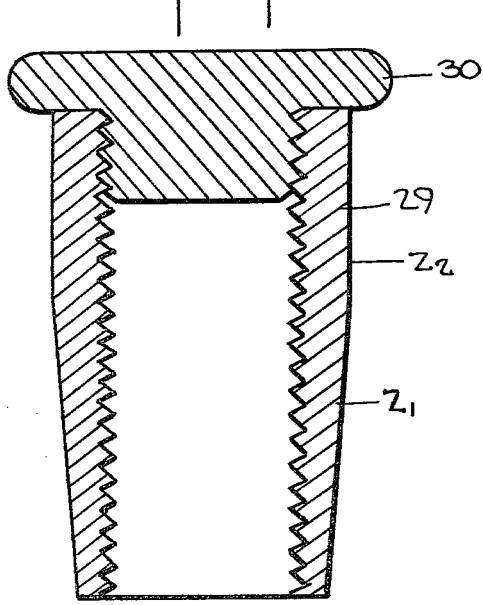
Fig. 21
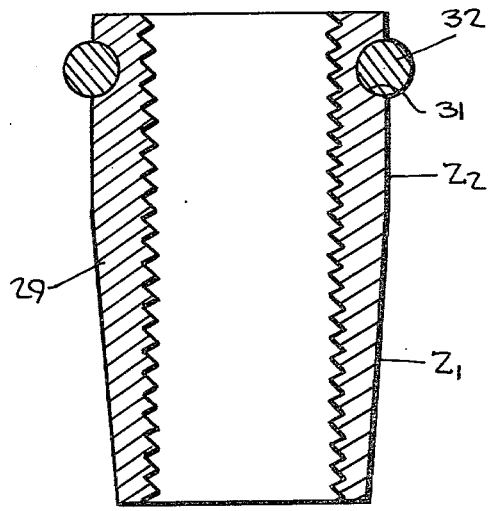
Fig. 22.

ANCHOR BOLT ASSEMBLY

BACKGROUND OF INVENTION

This invention relates generally to expansion or anchor bolt assemblies adapted to secure articles to masonry surfaces, and more particularly to an assembly which when installed in a hole drilled in the masonry is rendered vibration-proof so that the bolt cannot be loosened even under severe vibratory conditions.

It is frequently necessary to bolt fixtures and other heavy parts to the surface of brickwork, concrete and other forms of masonry. For this purpose, it is the conventional practice to make use of an anchor bolt assembly having an expansible shell which serves to securely retain the bolt within the masonry hole. Anchor bolt assemblies come in diverse forms, but in all such assemblies, some means are provided to bring about the dilation of an expansible shell or similar component against the wall of the masonry hole to anchor the bolt therein.

Thus in the prior Giannuzzi U.S. Pat. No. 3,766,819, the bolt whose threaded front end protrudes out of the masonry hole has a waist of reduced diameter adjacent its rear end, the waist being encircled by an expansible shell. The rear end of the bolt has a conical formation such that when during a fastening operation the bolt is slowly withdrawn from the hole by a nut turning on its threaded front end, the rear end cone of the bolt is axially advanced towards and into the shell to expand the shell against the wall of the hole, thereby anchoring the bolt in the masonry.

A similar expansion-type fastener is disclosed in the McIntyre U.S. Pat. No. 4,056,037. One serious objection to anchor bolt assemblies of these known types is that, once installed, the bolt is permanently anchored in the masonry and cannot be removed therefrom, so that it always protrudes from the masonry, even when no longer in use.

Another type of expansion anchor is that disclosed in the Zifferer U.S. Pat. No. 3,742,809 in which the bolt has a conically-tapered and threaded rear end portion which cooperates with an internally-tapered and threaded expansion sleeve, such that when the bolt is turned with a wrench or other torque-producing tool, the bolt is caused to rotate into the expansion sleeve which is thereby forced outwardly to anchor the bolt in the hole drilled in masonry. While this type of anchor bolt makes is possible to later remove the bolt, leaving the sleeve within the hole, it is a difficult anchor to install properly. The head of the bolt must be located away from the face of the fixture before tightening. The installer must guess at the amount of expansion that will be required to secure the proper hold on the masonry since the bolt must contact the fixture being fastened when the expansion is complete.

The primary concern of the present invention is with anchor bolt assemblies of the type disclosed in the Dempsey U.S. Pat. No. 2,988,950 in which a wedge nut is received on the threaded rear end of the bolt. When the bolt is turned by a wrench, this bolt is caused to travel downwardly on the bolt to enter and expand an expansible shell, forcing this shell into tight engagement with the wall of the hole in which the bolt is inserted. The main deficiency of bolt anchors of this known type is that the wedge nut is never locked to the bolt, and under severe vibratory conditions, the bolt may be loosened from the nut, thereby weakening the anchor.

The following U.S. Pat. Nos. represent other relevant prior art known to applicant: Kinnear 704,547, Craig 332,701, Ploch 3,523,482, Polos 3,878,264, Polmon 3,270,793, McNulty 798,440, Lewis 2,667,099.

SUMMARY OF INVENTION

In view of the foregoing, it is the primary object of this invention to provide an anchor bolt assembly formed by a bolt in combination with an expansible shell and a wedge nut, which assembly, when installed in the masonry hole to fasten a fixture or other heavy article to the surface thereof, is rendered vibration-proof.

More particularly, it is an object of the invention to provide an assembly of the above-type in which the wedge nut includes a compressible gripper ring whose normal diameter is somewhat greater than that of the masonry hole, whereby when the bolt assembly is inserted in the hole, the gripper ring is compressed to constrict the threaded bore therein, such that when the threaded end of the bolt enters this bore, it is locked thereby.

Yet another object of the invention is to provide an assembly of the above-type in which a deformable collar is interposed between the expansible shell and the shoulder of the bolt, which collar permits the head of the bolt to advance against the fixture being fastened.

Also an object of the invention is to provide a highly effective anchor bolt of simple and inexpensive design.

Among the features and advantages of a bolt assembly in accordance with the invention are the following:

A. No spot-setting is required; for the assembly will enter a "normal size" hole in the fixture without difficulty.

B. The anchor is self-energizing under load conditions; the heavier the load imposed on the assembly, the greater the resultant holding power.

C. When the bolt is fully inserted in the masonry hole, the head of the bolt is seated against the fixture before the bolt is tightened, no pre-positioning being required.

D. Because the gripper ring attains a diameter greater than that of the masonry hole when the threaded portion of the bolt enters therein, the resultant expansion thereof supplements the expansion effects of the shell and creates an anchor that will hold even in relatively soft masonry such as in aerated concrete; for both the gripper ring and the shell become locked into the masonry.

E. The bolt is readily recoverable from the masonry hole, and when removed, nothing is left protruding above the surface of the hole.

F. The bolt is reusable, so that when a bolt is removed from a hole in which the deformable collar, the expansible shell and the wedge nut of the assembly are left behind, a fresh assembly may be re-formed by adding a new collar, a new expansion shell and wedge nut to the bolt.

G. By providing a bolt with fine (UNF and NF) threading, it becomes possible for the installer to pre-torque the anchor, thereby reducing "slippage" as heavy loads are applied. This feature is of particular importance in that many building codes now rate masonry anchors in terms of the holding power achieveable before the anchor slips 1/16th of an inch.

Briefly stated, these and other objects are attained in a bolt anchor assembly in accordance with the invention constituted by a bolt in combination with a deformable collar, an expansible shell and a wedge nut, the bolt having an enlarged head which lies against the fixture to be mounted against the masonry surface and is engageable by a torque tool.

The bolt has a uniform diameter that is slightly smaller than that of the insertion hole drilled in the masonry, except for its threaded rear section which is of reduced diameter. Encircling the upper portion of the rear section is the deformable collar, whose normal diameter corresponds to that of the bolt, below which is the expansible shell which when dilated by the wedge nut, is forced against the wall of the hole to anchor the bolt therein.

The internally-threaded wedge nut is threadably received on the lower portion of the rear section of the bolt, the wedge nut having an upper conical zone whose minimum diameter approaches the reduced diameter of the rear section, so that it is able to enter the space between this section and the shell, the maximum diameter of the conical zone corresponding to the bolt diameter. The wedge nut further includes an intermediate cylindrical zone whose diameter corresponds to the bolt diameter and a lower ring zone whose normal maximum diameter is somewhat larger than that of the masonry hole.

An array of longitudinally-extending slots is cut into the ring zone, which slots enter into the cylindrical zone to define spring fingers which, when the ring zone is forced into the hole, is flexed inwardly thereby to compress the ring and constrict the internally-threaded bore thereof.

When the bolt assembly is fully inserted in the masonry hole and the head of the bolt is turned by the tool, the wedge nut, whose rotation is prevented by the compressed ring zone, is axially advanced toward the shell, the conical zone of the nut entering the annular space between the shell and the rear section of the bolt and acting to progressively expand the shell against the wall of the hole until a point is reached where the threaded end of the rear section enters and is gripped by the constricted bore of the compressed ring, the gripping pressure locking the nut onto the bolt and preventing loosening thereof under vibratory conditions. In addition, the ring zone, because it is of larger diameter than the hole in the masonry, is impressed into the masonry to enhance the holding power of the anchor.

As expansion of the shell is occurring, the axial load imposed upon the deformable collar results in compression thereof and allows the head of the bolt to advance forward to clamp the fixture securely to the masonry wall.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a preferred embodiment of an anchor bolt assembly in accordance with the invention;

FIG. 2 is an exploded view of the bolt assembly;

FIG. 3 is a longitudinal section taken through the lower portion of the assembly;

FIG. 4 is the same section as that in FIG. 3, showing the effect of wedge nut advance on the shell;

FIG. 5 is a transverse section taken in the plane indicated by line 5—5 in FIG. 3;

FIG. 6 illustrates the first installation step for anchoring a fixture to a masonry wall by means of the assembly;

FIG. 7 illustrates the second installation step shell;

FIG. 8 illustrates the third installation step;

FIG. 17 is a modified expansible shell;

FIG. 18 is another form of shell;

FIG. 19 is still another shell;

FIG. 20 is yet another shell;

FIG. 21 is another form of wedge nut;

FIG. 22 is still another form of wedge nut; and

FIG. 23 is a modified form of wedge nut.

DETAILED DESCRIPTION OF INVENTION

Structure of Assembly

Figure 9:
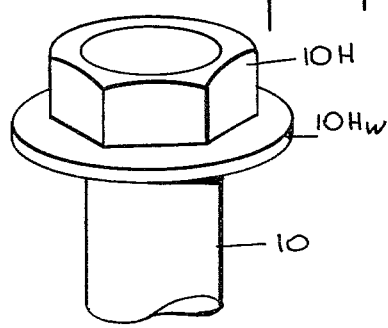
FIG. 9 is a perspective view of another version of the bolt head.

Referring now to FIGS. 1 and 2, there is shown a preferred embodiment of an anchor bolt assembly in accordance with the invention. The assembly, all of whose load-bearing components are preferably fabricated of steel to satisfy fire code requirements, is constituted by a bolt 10, a deformable collar 11, and expansible shell 12 and a wedge nut 13. Deformable collar 11 is fabricated of a lead alloy or a plastic material such as nylon which undergoes deformation when subjected to compression.

By way of example, we shall describe the bolt anchor assembly as being designed for insertion in a masonry hole drilled by a nominal half-inch diameter carbide drill, the hole produced thereby actually having a 0.530-inch diameter. Bolt 10 has a ½ inch diameter and therefore fits easily into the slightly larger 0.530-inch hole. Bolt 10 has an enlarged hexagonal head 10H and a rear section 14 of reduced diameter (i.e., 0.368-inch) to define a shoulder 15.

Rear section 14 of the bolt is threaded, the threading being of the fine or UNF type to provide a vernier action. Deformable collar 11 encircles the upper portion of rear section 14 of the bolt to abut shoulder 15, while expansible shell 12 encircles the mid-portion of rear section 14, the leading edge of the shell abutting the end of the collar. The normal diameter of both collar 11 and shell 12 substantially corresponds to that of bolt 10 so that they do not interfere with insertion of the bolt.

Shell 12 is preferably composed of a pair of complementary shields 12A and 12B whose contoured ends intermesh with each other and go around the threads of the rear section of the bolt more than 180°, thereby embracing the rear section.

The construction of the expansible shell is such that when wedge nut 13 enters the tight annular space between the shell and the threaded rear section of the bolt encircled thereby, the sleeve is forcibly expanded outwardly against the wall of the masonry hole to securely anchor the bolt therein.

As best seen in FIGS. 3 and 4, the internally threaded wedge nut 13 includes an upper conical zone $Z_1$, which in practice may have a small angle taper except for its bevelled leading edge. The minimum diameter of zone $Z_1$ approaches the diameter of the threaded rear section 14 of the bolt, the bevelled leading edge thereof facilitating entry of the conical zone of the wedge nut into the shell. The maximum diameter of conical zone $Z_1$ corresponds approximately to that of bolt 10 (i.e., 0.500-inch).

The upper conical zone $Z_1$ merges with an intermediate cylinder zone $Z_2$, whose diameter corresponds to that of bolt 10, zone $Z_2$ being followed by a lower gripper ring zone $Z_3$, whose maximum normal diameter at the flat of the ring is somewhat greater than that of the hole drilled in the masonry. Thus for a 0.530-inch masonry hole, the maximum gripper ring diameter is 0.562-inch.

Cut into gripper ring zone $Z_3$ are longitudinal slots $S_1$, $S_2$, $S_3$ etc., which extend into intermediate cylinder zone $Z_2$ to define flexible spring fingers, whereby when the bolt assembly is forced into the masonry hole, the fingers are flexed inwardly, as shown in FIG. 4, to compress the gripper ring to thereby create an outward tension applying anchoring force onto the wall of the hole which resists rotation of the wedge nut. The slot configuration illustrated in the figure is but one of several possible arrangements. Thus in practice one may cut six slots into the nut at 60° intervals therein.

Installation of Assembly

Referring now to FIG. 6, there is shown the first step to be taken when fastening a fixture or other article to the surface of masonry in which a hole H is drilled. We shall assume that the article to be fastened is in the form of a bracket 16 having a hole therein which registers with the hole H in the masonry. In the first step, the bolt assembly is placed with the wedge nut end thereof directly over the hole in the bracket in axial alignment with the hole in the masonry.

Since gripper ring zone $Z_3$ of the wedge nut 13 has a diameter somewhat larger than that of the hole in the bracket as well as the hole in the masonry, it is necessary, as shown in FIG. 7, to tap the assembly in with a hammer, to compress the gripper ring zone and to thereby permit insertion of the assembly into the masonry hole.

The assembly is tapped into hole H until it is fully inserted therein with head 10H of the bolt lying flush against bracket 16. At this point, as shown in FIG. 8, the head is engaged by a wrench or other torque-producing tool, and the bolt is turned, the gripper ring on the wedge nut which is compressed by the wall of the masonry hole then preventing rotation of the nut.

As the bolt continues to turn, the wedge nut 13 advances axially therein toward expansible shell 12, the conical zone $Z_1$ entering the space between the shell and the rear section 14 encircled thereby. The conical zone, as it advances, dilates the shell and forces it outwardly against the wall of the hole H to develop the holding power of the anchor. It is to be noted that a heavy load on bracket 16, which would otherwise seek to pull bolt 10 out of the hole, would at the same time serve to force wedge nut 13 further into shell 12 and thereby enhance the anchoring power thereof, so that in this sense, the load serves to energize the anchor; the heavier the load, the greater the anchoring effect.

As the bolt continues to turn, a point is reached, as shown in FIG. 8, where the end of the rear section 14 of the bolt enters the internally-threaded bore of the gripper ring zone $Z_3$. Since this bore has been constricted by the compression of the ring as a result of which the pitch diameter of its threading is less than that of the mating threads on section 14 of the bolt, the bore threading is pressed against that of the threaded end of the bolt to produce a grasping force locking the mating threads. This locking action serves to prevent loosening of the bolt as a result of vibratory forces, as may be encountered in certain installations, thereby effectively rendering the installation vibration-proof.

As expansion of shell 12 increases, the axial force on the bolt opposing the upward movement of the cone acts to compress and deform collar 11 immediately above the shell, this compression permitting the bolt head 10H to advance forward until it locks tightly against the fixture 16. It must be borne in mind that in some instances where, for example, the fixture is of wood and is slightly warped so that it does not lie flat against the masonry wall, it is not enough for the bolt head to lie flush against the fixture; for one must continue to turn the bolt until the head thereof forces the fixture against the wall.

It will be appreciated that when the same tool is used to turn the bolt in the reverse direction, this serves to unlock the bolt from the nut, and it becomes possible to remove the bolt from the hole without difficulty, leaving the collar, the expansion shell and the wedge nut behind. The bolt may then be reused in a new assembly by applying a fresh collar, shell and wedge nut thereto.

Modified Bolt Heads

As shown in FIG. 9, since head 10H of the bolt in FIG. 1 is designed to lie flush against the fixture or other article to be fastened to the masonry, the head of bolt 10 may by provided with an integral washer $10H_w$ to enlarge the bearing surface.

Figure 11:
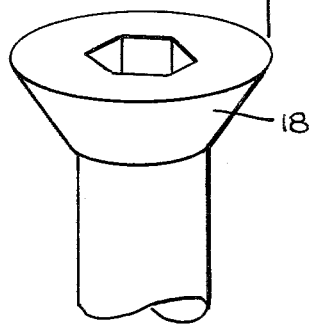
FIG. 11 is yet another bolt head configuration.
Figure 12:
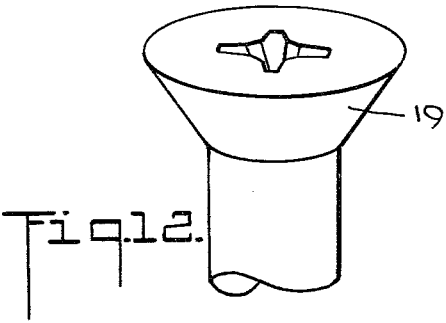
FIG. 12 shows an alternative form of bolt head.

Bolt heads of the type shown in FIGS. 1 and 9 are designed to protrude above the surface of the fixture in whose hole the bolt is inserted. In some instances, it may be desirable for the bolt head to be recessed in the fixture hole, in which case heads of the type shown in FIGS. 10, 11, and 12 are appropriate.

Figure 10:
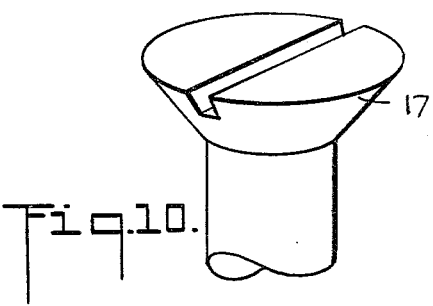
FIG. 10 shows still another version of the bolt head.

In FIG. 10, bolt head 17 of the slotted-head type so that the bolt may be turned with a screwdriver or similar torque tool, the head having a conical shape so that it is receivable in a similarly-shaped hole in the fixture, as a consequence of which the head does not protrude thereabove. In FIG. 11, bolt head 18 has a socket formed therein to receive a socket-type torque tool; whereas in FIG. 12, bolt head 19 is of the Phillips-screw type, so that it can be turned with a Phillips-type torque tool, both heads having a conical formation to facilitate recessing thereof.

Modified Expansible Shell Structures

Figure 13:
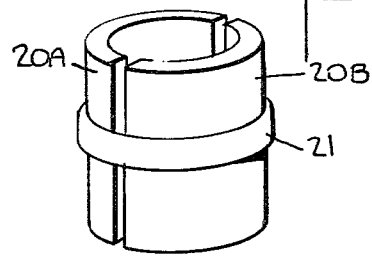
FIG. 13 is a modified form of expansible shell.

The invention is not limited to the particular shell configuration shown in FIG. 1. Thus one may use, as shown in FIG. 13, an expansible shell formed by a pair of half shields 20A and 20B which are temporarily bound together by a rupturable tape 21, so that when the cylinder defined by the half-shields is expanded by the conical zone of the wedge nut, the tape is ruptured to permit outward displacement of the shields against the wall of the masonry hole.

Figure 14:
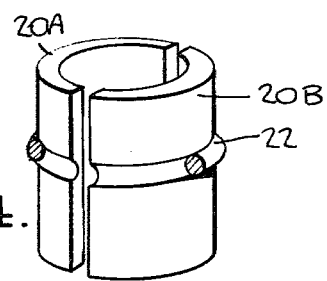
FIG. 14 is another type of expansible shell.
Figure 15:
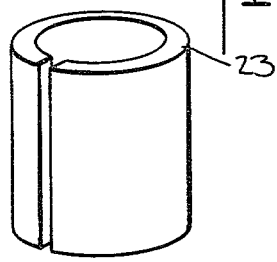
FIG. 15 is still another form of shell.
Figure 16:
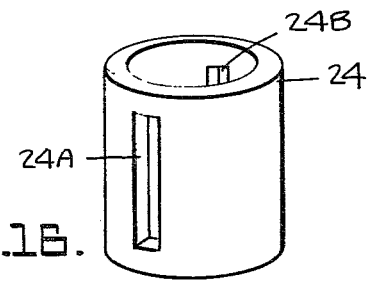
FIG. 16 is yet another form of shell.

In the configuration shown in FIG. 14, the half-shields 20 and 20A are tied together by a rupturable wire ring 22. Alternatively, the expansible shell, as shown in FIG. 15, may simply take the form of a split sleeve 23. Or, as shown in FIG. 16, by a sleeve 24 having diametrically-opposed slots 24A and 24B therein to define two halves held together by easily rupturable interconnections. Still another version is shown in FIG.

17, wherein double-slots 25A and 25B in shell 25 are cut at diametrically-opposed positions.

In the expansible shells shown in FIG. 1 and in FIGS. 13 to 17, the diameter of the shell is approximately the same as that of the bolt 10, so that the shell itself does not impede insertion of the bolt in a masonry hole. In some instances, it may be desirable for the shell to include protuberances which require forcing of the shell into the masonry hole, so that the shell is initially locked in place before it is dilated.

Thus in FIG. 18, two-piece shell 26, which is similar to that in FIG. 1, is provided with a pair of opposing struck-off protuberances 26A and 26B, while in shell 27 shown in FIG. 19, the protuberances 27A and 27B have a shoulder-like formation. In FIG. 20, the slotted shell 28 has a barrel-like formation whose greatest diameter exceeds that of the bolt.

Modified Wedge Nuts

In FIG. 1, the wedge nut has a slotted gripper ring to define spring fingers which, when compressed, serve to lock the nut into the threaded bolt. In some instances, this locking feature may not be required, but it is still essential that the wedge nut engage the wall of the masonry hole to prevent rotation thereof when the bolt is turned to advance the wedge nut into the expansible shell to expand the shell.

To this end, as shown in FIG. 21, wedge nut 29 for the assembly has a conical front zone $Z_1$ and an unslotted cylindrical rear zone $Z_2$. A plug 30 of a deformable material, such as lead or semi-rigid plastic, is inserted into the cylindrical zone, the plug having an enlarged circular head whose diameter is greater than that of cylindrical zone $Z_2$.

Or, as shown in FIG. 22, wedge nut 29 may be provided with an annular groove 31 in unslotted zone $Z_2$, which groove accommodates a deformable O-ring 32 whose diameter exceeds that of zone $Z_2$. This ring prevents rotation of the wedge nut when it is forced into a masonry hole.

FIG. 23 shows a slotted wedge nut 13 of the type shown in FIG. 1, but with a knurled gripper ring 13k to improve the holding action of the ring.

While there has been shown and described a preferred embodiment of an anchor bolt assembly in accordance with the invention, it will be appreciated that many changes and modifications may be made therein without, however, departing from the essential spirit thereof.

I claim:

1. An anchor bolt assembly adapted to fasten a fixture having a hole therein of nominal diameter against the surface of masonry or other material having a hole of substantially the same diameter drilled therein, said assembly comprising:
   A. a bolt having a diameter slightly smaller than that of the masonry hole, the bolt being provided with an enlarged head engageable by a torque tool for turning the bolt, and a threaded rear section of reduced diameter;
   B. an expansible shell loosely encircling the upper portion of the rear section to define an annular space therebetween, the unexpanded diameter of said shell being substantially the same as the diameter of the bolt; and
   C. a wedge nut provided with an internally-threaded bore threadably received on the lower portion of the rear section, said nut having an upper conical zone whose maximum diameter does not exceed the diameter of the bolt and a compressible and expansible lower gripper ring zone whose normal maximum diameter is greater than that of said masonry hole, said ring zone having slots cut therein to define spring fingers which when deflected inwardly create a constricted bore whose internal threads grip the mating threads at the end of said rear section of the bolt to provide a locking action when the end of said rear section is turned in the ring zone, the anchor bolt assembly being tappable through the fixture hole into the masonry hole until it is fully inserted therein with said bolt head lying against said fixture, the gripper ring zone then being compressed by the wall of the masonry hole to prevent rotation of the wedge nut whereby when the bolt is then turned by the tool, the wedge nut then advances axially toward said shell and the conical zone thereof enters said annular space to expand the shell and force it outwardly against the wall of the masonry hole to create a first anchoring force, the expansion of the ring zone when the end of the rear section is turned therein creating a second anchoring force resisting withdrawal of the bolt from the masonry hole.

2. An assembly as set forth in claim 1, wherein said bolt, said shell and said nut are all fabricated of steel.

3. An assembly as set forth in claim 1, wherein said head has a washer integral therewith.

4. An assembly as set forth in claim 1, wherein said head has a conical formation to permit recessing thereof in the fixture hole.

5. An assembly as set forth in claim 4, wherein said head has a Phillips-screw socket.

6. An assembly as set forth in claim 1, wherein said shell is formed by a pair of arcuate shields which interlock with each other.

7. An assembly as set forth in claim 1, wherein said shell is formed by two arcuate half sections held together by a rupturable band.

8. An assembly as set forth in claim 5, wherein said rupturable band is formed of wire.

9. An assembly as set forth in claim 1, wherein said shell has diametrically-opposed protuberances to prevent rotation thereof in said masonry hole.

10. An assembly as set forth in claim 1, wherein said slots are formed at 60° intervals in said ring zone.

11. An assembly as set forth in claim 1, wherein the leading edge of said conical zone is bevelled to facilitate its entry into said shell.

12. An assembly as set forth in claim 1, wherein said ring zone is knurled to enhance its resistance to rotation.

13. An assembly as set forth in claim 1, wherein said rear section and said internally-threaded nut bore have fine threading.

14. An assembly as set forth in claim 1, further including a collar encircling said rear section and interposed between the shell therein and a shoulder between the bolt and the rear section thereof, said collar being formed of deformable material which is compressed to permit tightening of the fixture against the surface of the masonry.

15. An assembly as set forth in claim 14, wherein said collar is formed of semi-rigid nylon.

16. An assembly as set forth in claim 14, wherein said collar is formed of lead.

* * * * *